United States Patent [19]
Nakano et al.

[11] Patent Number: 5,315,581
[45] Date of Patent: May 24, 1994

[54] HIT-LESS PROTECTION SWITCHING METHOD AND APPARATUS FOR ATM TRANSMISSION LINES

[75] Inventors: Yukio Nakano, Hachioji; Akihiko Takase, Tokyo; Masahiro Takatori, Kokubunji; Junichirou Yanagi, Kodaira, all of Japan

[73] Assignee: Hitachi, Ltd., Tokyo, Japan

[21] Appl. No.: 744,717

[22] Filed: Aug. 14, 1991

[30] Foreign Application Priority Data

Aug. 17, 1990 [JP] Japan .................... 2-215708

[51] Int. Cl.$^5$ .......................... H04B 1/74; H04L 1/02
[52] U.S. Cl. ...................................... 370/16; 340/827
[58] Field of Search ............... 370/13, 14, 16, 85.9; 340/827; 379/1; 371/8.1, 8.2

[56] References Cited

U.S. PATENT DOCUMENTS

| | | | |
|---|---|---|---|
| 4,477,895 | 10/1984 | Casper et al. | 370/16 |
| 4,630,265 | 12/1986 | Sexton | 370/85.9 |
| 4,799,237 | 1/1989 | Itoh | 371/8.2 X |
| 5,051,979 | 9/1991 | Chaudhuri et al. | 370/16 |

OTHER PUBLICATIONS

"Hit-less Portection Switching Technique for ATM Network", B-722.

Primary Examiner—Douglas W. Olms
Assistant Examiner—Russell Blum
Attorney, Agent, or Firm—Antonelli, Terry, Stout & Kraus

[57] ABSTRACT

A hit-less protection switching method and apparatus therefor for ATM transmission lines for selecting first cells from normal received signals and writing the same into a normal cell buffer, selecting second cells from emergency received signals and writing the same into an emergency cell buffer, reading the first cells from the normal cell buffer after a first delay time, reading the second cells from the emergency cell buffer after a second delay time, comparing the contents of the first cell with the contents of the second cell and changing the difference between the first delay time and the second delay time, when a state of discrepancy between the contents of the first cell and the contents of the second cell is continuously detected for a predetermined time, to dissolve the state of discrepancy, and selecting one of the cells read from the normal cell buffer and the emergency cell buffer with a delay as communications information.

2 Claims, 2 Drawing Sheets

HIT-LESS PROTECTION SWITCHING METHOD AND APPARATUS FOR ATM TRANSMISSION LINES

BACKGROUND OF THE INVENTION

While a packet in the packet transmission is called a "cell" in the ATM (Asynchronous Transfer Mode) communications, this invention relates to a hit-less protection switching method and circuit suitable for use in an ATM exchanger for switching information in cell units or in ATM cross-connect.

In transmission lines having a redundancy construction, protection switching of transmission lines is required for maintenance or the like in a working state. It is desirable in this case to perform a hit-less protection switching so as to avoid data defects in the services being conducted. Conventionally, there is the following hit-less protection switching method as described in "Hit-less Protection Switching Technique for ATM Network" by Tatsuno and Tokura, 1990 Spring National Meeting of Electronics and Telecommunications Academy, B-772 (March, 1990). Specifically explaining, for switching to an emergency transmission line on the transmission side, the transmission side delivers a cell including a switching signal indicative of the last cell on a normal transmission line. The reception side, after receiving this cell, reads cells accumulated in an emergency receiving circuit. The above-mentioned conventional method defines a particular cell indicating a switching signal for performing a hit-less protection switching.

SUMMARY OF THE INVENTION

It is an object of the invention to provide a method of and circuit for switching ATM transmission lines in a hit-less protection manner only by the operation of the reception side without communicating a control signal.

The hit-less protection switching method of the invention is quite novel and has never been seen before. In ATM communications to which the invention is applied, it is necessary to transmit ATM signals in both of a normal transmission line and an emergency transmission line.

The hit-less protection method of the invention for ATM transmission lines is applied to a switching of ATM transmission lines for selecting either one of received signals on the reception side, wherein assigned cells in a normal received signal, except for idle cells such as an empty cell, each is once written into a normal cell buffer and read therefrom with a delay of a predetermined time. On the other hand also in an emergency received signal, each assigned cell except for idle cells each is written into an emergency cell buffer and read therefrom after being delayed by a predetermined time. The contents of the assigned cell in the normal received signal, after being read from the normal cell buffer are compared with those of an assigned cell in an emergency received signal. When discrepancy of the contents of the assigned cells between both signals is detected sequentially in more than a predetermined number of cells, a difference between a delay time until read-out of the assigned cells in the normal cell buffer and a delay time until read-out of the assigned cells in the emergency cell buffer is changed. Thus, the contents of the assigned cells, after read from both of the buffers, are made coincident with each other.

A circuit for implementing the above method includes:

a normal signal receiving circuit for receiving ATM signals from a normal transmission line;

an emergency signal receiving circuit for receiving ATM signals from an emergency transmission line;

a normal cell buffer for selecting only assigned cells except for idle cells in ATM cells transferred from the normal receiving circuit, storing therein and delaying the assigned cells by a predetermined time;

an emergency cell buffer for selecting only assigned cells except for idle cells in ATM cells transferred from the emergency receiving circuit, storing therein and delaying the assigned cells by a predetermined time;

a cell coincidence detecting circuit for detecting a coincidence of the contents of the ATM cells outputted from the normal cell buffer with the contents of the ATM cells outputted from the emergency cell buffer;

a buffer read phase control circuit for changing the difference between a delay time of the assigned cells in the normal received signal caused by the normal cell buffer and a delay time of the assigned cells in the emergency received signal caused by the emergency cell buffer, in accordance with an indication of the cell coincidence detecting circuit; and a selecting circuit for selecting one of the ATM cell outputted from the normal cell buffer and the ATM cell outputted from the emergency cell buffer.

In the invention, the reception side controls the delay so as to coincide the contents of assigned cells on the normal transmission line and those of assigned cells on the emergency transmission line, so that ATM transmission lines can be switched in a hit-less protection manner only by the operation of the reception side without communicating any control signal with far end equipment.

DESCRIPTION OF THE PREFERRED EMBODIMENTS

Figure 1:
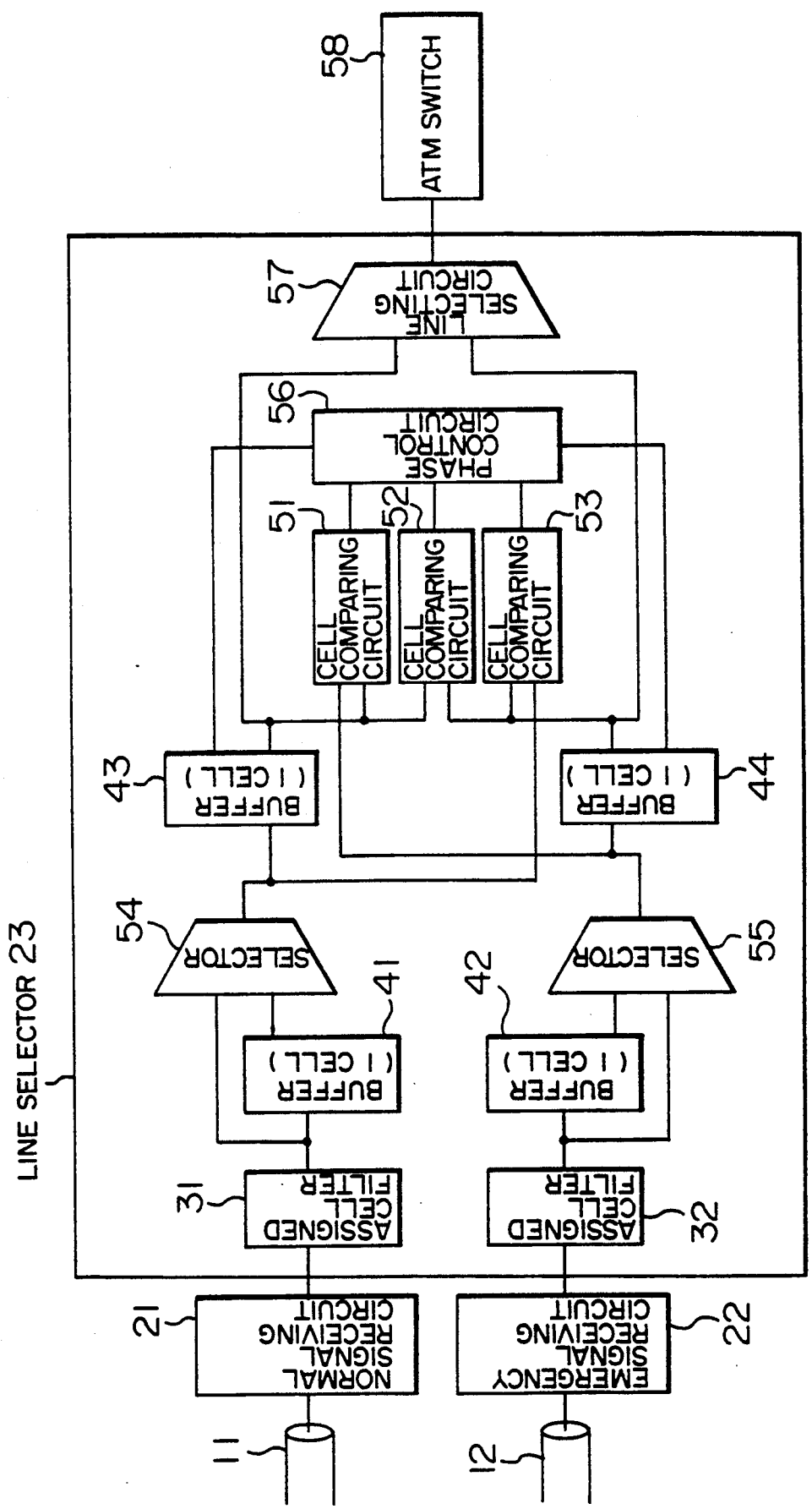
FIG. 1 is a block diagram illustrating an embodiment of the invention.

An embodiment of the invention will hereinbelow be described with reference to FIG. 1. The embodiment shown in FIG. 1 comprises a normal transmission line 11, an emergency transmission line 12, a normal signal receiving circuit 21, an emergency signal receiving circuit 22, and a line selector 23. The selector 23 comprises a normal assigned cell filter 31, an emergency assigned cell filter 32, normal cell buffers 41 and 43, each having the capacity of one cell, emergency cell buffers 42 and 44 each having the capacity of one cell, cell comparing circuits 51-53, selectors 54 and 55, a phase control circuit 56 and a line selecting circuit 57. Data on a transmission line selected by the line selecting circuit 57 is transferred to an ATM switch 58 as communications information.

Next, the operation of the present embodiment will be explained. The embodiment shows a hit-less protection switching circuit for transmission lines such as intra-office transmission lines, where the difference in delay time between a normal transmission line and an emergency transmission line is relatively small, compared with a transmission time required for transmitting a cell.

Figure 2:
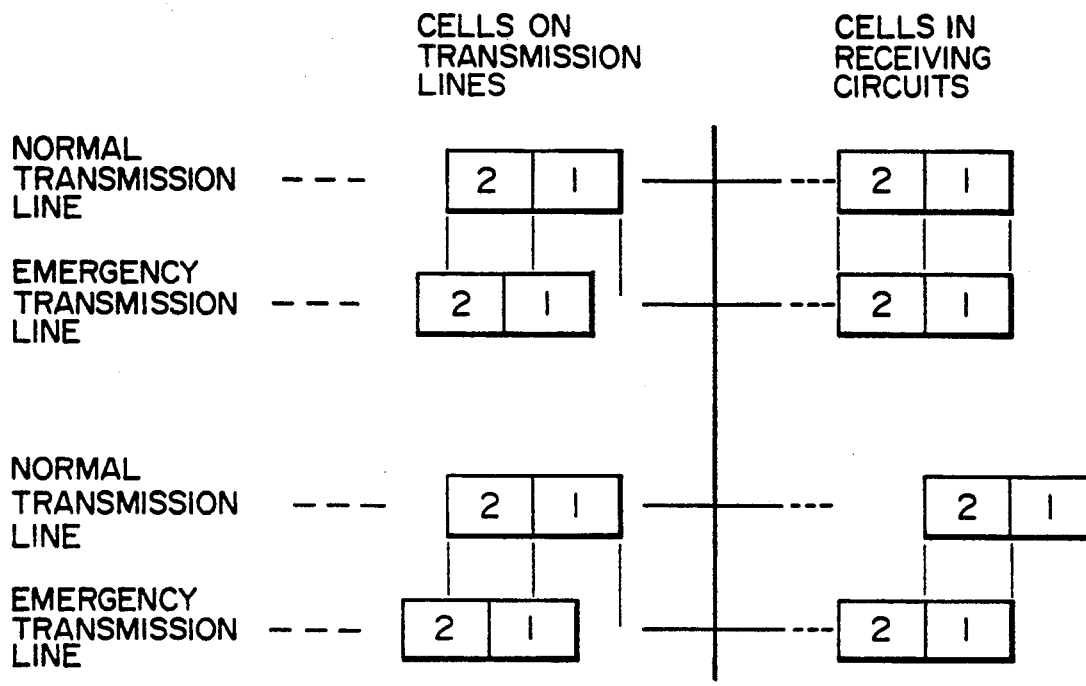
FIG. 2 is a diagram illustrating states of cells inputted to a line selector.
Figure 3:
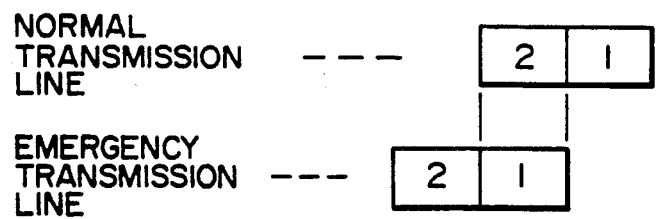
FIG. 3 is a diagram illustrating states of cells when the contents thereof are not coincident with each other.
Figure 4:
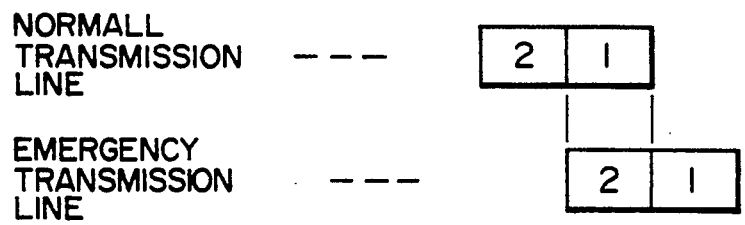
FIG. 4 is a diagram illustrating states of cells when the contents thereof are not coincident with each other.

Far end equipment simultaneously transmits identical assigned cells to the normal transmission line 11 as well as to the emergency transmission line 12. A normal ATM signal inputted from the normal transmission line 11, after a delineation has been established by a cell for detecting the cell head (or the position of a header), is transferred to the line selector 23. Similarly, an emergency ATM signal inputted from the emergency transmission line 12 is transferred to the line selector 23 after cell delineation has been established. Since transmitted cells include at least several percents of idle cells with no data, the normal assigned cell filter 31 determines whether or not each of cells received from the normal signal receiving circuit 21 is an assigned cell, and writes only assigned cells into the normal cell buffer 41 or into the normal cell buffer 43 through the selector 54. When the normal cell buffer 43 is empty, each assigned cell is directly written thereinto. Otherwise, a cell are once written into the normal cell buffer 41 and transferred to the normal cell buffer 43 when it becomes empty. The normal cell buffer 43 temporarily stores an assigned cell transferred from the selector 54 and transfers the previously stored assigned cell to the selector 57 in accordance with an indication of the phase control circuit 56, as will be later referred to. In other words, the normal cell buffers 41 and 43 operate as first-in first-out devices for cell-unit temporal storage. When the contents of an assigned cell are written directly into the normal buffer 43 and thereafter read therefrom, a delay of one cell is caused. On the other hand, when the contents of an assigned cell are once written into the normal cell buffer 41, transferred to the normal cell buffer 43 and then read from the normal cell buffer 43, a delay of two cells is caused. Generally, data is flowing with a delay of one cell. A two-cell delay occurs after output from the normal cell buffer 43 is stopped for a time corresponding to one cell by a change in delay time, later referred to. The emergency assigned cell filter 32, the emergency cell buffers 42 and 44 operates in a manner similar to the normal counterparts. The cell comparing circuits 51, 52 and 53 respectively determines whether the contents of every two assigned cells supplied thereto are coincident and supply the results to the phase control circuit 56. The cell comparing circuit 52 detects the coincidence of the contents of assigned cells simultaneously outputted from the normal cell buffer 43 and the emergency cell buffer 44. The cell comparing circuit 51 in turn detects the coincidence of the contents of an assigned cell outputted from the normal cell buffer 43 and the contents of an assigned cell inputted to the emergency cell buffer 44. Further, the cell comparing circuit 53 detects the coincidence of the contents of an assigned cell outputted from the emergency cell buffer 44 and the contents of an assigned cell inputted to the normal cell buffer 43. When assigned cells are accumulated in both of the normal cell buffer 43 and the emergency cell buffer 44, the phase control circuit 56 instructs the cell buffers 43 and 44 to simultaneously output the accumulated assigned cells. With a difference in delay between the normal transmission line 11 and the emergency transmission line 12 and a time quantization of the cell unit performed by the normal signal receiving circuit 21 and the emergency signal receiving circuit 22, both of which are provided with buffers, assigned cells simultaneously emitted from the far end equipment to the normal transmission line 11 and the emergency transmission line 12 arrive at the line selector 23 at the same time or with a difference of delay corresponding to one cell, as shown in FIG. 2. While the cell comparing circuit 52 is performing a coincidence detection, the contents of an assigned cell from the normal transmission path 11 is coincident with the contents of an assigned cell from the emergency transmission line 12, and moreover both assigned cells are simultaneously being transferred to the line selecting circuit 57, where the line selection is executed in a hit-less protection manner. A state in which the cell comparing circuit 52 detects a discrepancy and the cell comparing circuit 51 a coincidence indicates, as shown in FIG. 3, that a normal assigned cell is transferred to the line selecting circuit 57 earlier by a time corresponding to one cell than an emergency assigned cell. Therefore, if the state in which the cell comparing circuit 52 detects a discrepancy and the cell comparing circuit 51 a coincidence continues predetermined times, the phase control circuit 56 controls to once output an assigned cell only from the emergency buffer 44. During this operation, read-out from the normal buffers 41 and 43 are prohibited. The above-mentioned detection as to whether the state of coincidence and discrepancy continues the predetermined times is performed in order to prevent malfunctions due to transmission errors. However, this control is performed only when it is determined that an idle cell is inputted to the normal assigned cell filter 31. If this control is performed when data is stored in the normal cell buffers 41 and 43 and the inputted cell is an assigned cell, since there is no place for saving the subsequent or the inputted cell, the inputted cell comes to be spoiled. It should be therefore noted that this control must be performed when the subsequent cell is idle one. At least several percents of idle cells are included in data, so that the above-mentioned control may be executed after waiting several milliseconds until the idle cell comes. Execution of the control results in dissolving the state in which an assigned cell on the normal transmission line is transferred to the line selecting circuit 57 earlier by the time corresponding to one cell than that on the emergency transmission line, whereby the assigned cells on both transmission lines are simultaneously transferred to the line selecting circuit 57. On the contrary, a state in which the cell comparing circuit 52 detects a discrepancy and the cell comparing circuit 53 a coincidence indicates, as shown in FIG. 4, that an assigned cell on the emergency transmission line is transferred to the line selecting circuit 57 earlier by a time corresponding to one cell than that on the normal transmission line. If this state continues predetermined times, the phase control circuit 56 controls to only once output an assigned cell only from the normal cell buffer, when it is determined that an idle cell is inputted to the emergency assigned cell filter 32.

We claim:

1. A hit-less protection switching method for ATM transmission lines comprising the steps of:

selecting assigned cells from signals received through a normal transmission line and writing the selected assigned cells into a normal cell buffer;

selecting assigned cells from signals received through an emergency transmission line and writing the assigned cells into an emergency cell buffer;

reading a first assigned cell from said normal cell buffer with a first delay of a predetermined time and reading a second assigned cell from said emergency cell buffer with a second delay of a predetermined time simultaneously;

comparing contents of said first assigned cell with contents of said second assigned cell and detecting discrepancy between said contents;

changing a difference between said first delay of a predetermined time and said second delay of a predetermined time, when a state of the discrepancy between said contents is continuously detected for a predetermined time, so as to dissolve said state of the discrepancy; and selecting one of said assigned cells read from said normal cell buffer and from said emergency cell buffer as communication information based on operation commands, wherein said changing step includes a step of once stopping read-out from the cell buffer out of said normal cell buffer or said emergency cell buffer wherefrom assigned cells are previously read, and reading an assigned cell from the other cell buffer in the meantime when an idle cell is received as a received signal by a transmission line from which said assigned cells are previously read.

2. A hit-less protection switching apparatus for ATM transmission lines comprising:

normal receiving means for receiving ATM signals from a normal transmission line;

emergency receiving means for receiving ATM signals from an emergency transmission line;

first selecting means for selecting assigned cells from normal received signals;

second selecting means for selecting assigned cells from emergency received signals;

a normal cell buffer for storing the assigned cells selected from said normal received signals;

an emergency cell buffer for storing the assigned cells selected from said emergency received signals;

means for reading a first assigned cell from said normal cell buffer with a first delay of a predetermined time and reading a second assigned cell from said emergency cell buffer with a second delay of a predetermined time simultaneously;

means for comparing contents of said first assigned cell with contents of said second assigned cell and detecting discrepancy between said contents;

means for changing a difference between said first delay of a predetermined time and said second delay of a predetermined time, when a state of the discrepancy between said contents is continuously detected for a predetermined time, so as to dissolve said state of the discrepancy; and third selecting means for selecting one of said assigned cells read from said normal cell buffer and from said emergency cell buffer as communication information based on operation commands, wherein said changing means includes means for once stopping read-out of a previously outputted one of said assigned cells from said normal and emergency buffers and inputting a subsequently outputted one to said third selecting means in the meantime when an idle cell is received as a received signal by one of said normal and emergency transmission lines from which said assigned cells are previously outputted.

* * * * *